(12) United States Patent
Hong et al.

(10) Patent No.: US 7,217,765 B2
(45) Date of Patent: May 15, 2007

(54) STYRENIC POLYMER COMPOSITES

(75) Inventors: Sung Chul Hong, Hamden, CT (US);
Qinggao Ma, Naugatuck, CT (US);
Paul Edwin Stott, Southbury, CT (US);
John M. Wefer, Newtown, CT (US);
Leigh Cameron Allen, Winchester, CT (US)

(73) Assignee: Crompton Corporation, Middlebury, CT (US)

( * ) Notice: Subject to any disclaimer, the term of this patent is extended or adjusted under 35 U.S.C. 154(b) by 183 days.

(21) Appl. No.: 10/739,598

(22) Filed: Dec. 17, 2003

(65) Prior Publication Data

US 2005/0004310 A1    Jan. 6, 2005

Related U.S. Application Data

(60) Provisional application No. 60/433,954, filed on Dec. 18, 2002.

(51) Int. Cl.
*C08F 8/30* (2006.01)

(52) U.S. Cl. ................... 525/181; 525/184; 525/192; 525/241

(58) Field of Classification Search ................ 525/181, 525/184, 192, 241
See application file for complete search history.

(56) References Cited

U.S. PATENT DOCUMENTS 6,444,754 B1 *    9/2002    Chin et al. ................ 525/92 B

FOREIGN PATENT DOCUMENTS

| WO | 00/46274 | 8/2000 |
|---|---|---|
| WO | 02/059197 A2 | 8/2002 |

OTHER PUBLICATIONS

Ide et al., Journal of Applied Polymer Science, Studies on Polymer Blend of Nylon 6 and Polypropylene or Nylon 6 and Polystyrene Using the Reaction of Polymer, vol. 18, pp. 963-974, (1974).
Park et al., Polymer, Effect of Molecular Weight of Functionalized Polystyrene on the Compatibility of Blends of Polyamide 6 and Polystyrene, vol. 37, No. 14, pp. 3055-3063, (1996).
Chang et al., Polymer Engineering and Science, Styrene Maleic Anhydride and Styrene Glycidyl Methacrylate Copolymers as In Situ Reactive Compatibilizers of Polystyrene/Nylon 6,6 Blends, vol. 31, No. 21, pp. 1509-1519, (1991).
Jannasch et al., Journal of Applied Polymer Science, Poly(styrene-graft-ethylene oxide) as a Compatibilizer in Polystyrene/Polyamide Blends, vol. 58, pp. 753-770, (1995).
Park et al., Polymer, The Fabrication of Syndiotactic Polystyrene/ Organophilic Clay Nanocomposites and their Properties, vol. 42, pp. 7465-7475, (2001).
Koulouri et al., Macromolecules, Terminal Anhydride Functionalized Polystyrene by Atom Transfer Radical Polymerization Used for Compatibilization of Nylon 6/PS Blends, vol. 32, pp. 6242-6248, (1999).
Georges et al., Macromolecules, Narrow Molecular Weight Resins by a Free-Radical Polymerization Process, vol. 26, pp. 2987-2988, (1993).
Park et al., Journal of Polymer Science, Living Radical Copolymerization of Styrene/Maleic Anhydride, vol. 38, pp. 2239-2244 (2000).
Benoit et al., Macromolecular, One-Step Formation of Functionalized Block Copolymers, vol. 33, pp. 1505-1507, (2000).
Matyjaszewski et al., Macromolecules, Simple and Efficient Synthesis of Various Alkoxyamines for Stable Free Radical Polymerization, vol. 31, pp. 5955-5957, (1998).
Harth et al., Macromolecules, Chain End Functionalization in Nitroxide-Mediated Living Free Radical Polymerizations, vol. 34, pp. 3856-3862, (2001).

* cited by examiner

*Primary Examiner*—Peter D. Mulcahy
(74) *Attorney, Agent, or Firm*—Daniel Reitenbach

(57) ABSTRACT

A composite composition is disclosed that comprises the reaction product of a mixture of a styrenic polymer, as defined herein, a polar component having nucleophilic functional groups, and from 0.5 to 10 wt % of a compatibilizer having the formula:

$R_y(I)\text{-(styrene)}_n\text{-[(styrene)}_m(X)]_p\text{—I}(R_y)$

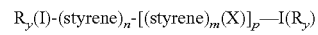

wherein:
R is the residue of a nitroxide used to regulate the polymerization of the compatibilizer;
I is the residue of a radical initiator used to initiate polymerization of the compatibilizer;
n is an integer from 50 to 750;
m is an integer from 0 to 10;
p is an integer from 1 to 50; and
y is an integer from 0 to 1; and
X is any polymerized monomeric moiety having at least one functional group capable of reacting with the nucleophilic functional groups present in the polar component of the composite at the temperature at which the composite components are mixed.

14 Claims, No Drawings

STYRENIC POLYMER COMPOSITES

We claim the benefit under Title 35, United States Code, § 120 to U.S. Provisional Application No. 60/433,954, filed Dec. 18, 2002, entitled STYRENIC POLYMER COMPOSITES.

BACKGROUND OF THE INVENTION

1. Field of the Invention

The present invention relates to composite materials comprising at least one styrenic polymer, as defined herein, e.g., polystyrene or polymers completely miscible with polystyrene, and minerals, and/or an organic filler, and/or glass fiber, and/or thermoplastics.

2. Description of Related Art

For the past two decades very few new thermoplastic polymers have been developed. Instead, new materials have been created as alloys, blends, and composites of existing thermoplastic polymer materials, either in combination with each other or with inorganic reinforcing materials, such as minerals or glass fiber.

Generally, thermoplastics are divided into two groups. The first group comprises simple hydrocarbon polymers, e.g., polyolefins and styrenics typified by polypropylene and polystyrene. They have relatively modest physical properties, such as heat distortion, impact resistance, and the like, but are relatively simple to manufacture, easy to process, and have no reactive functional groups, and are thus resistant to humidity, aggressive chemicals, and the like.

The second group of thermoplastics, the so-called engineering resins, owe their superior physical properties, such as high strength and high heat stability, to the presence of highly polarized functional groups whose strong dipolar interactions lead to crystallinity and high melting points, but make them difficult to process and susceptible to hydrolysis and chemical degradation. Polyamides (Nylons), inter alia, typify this class of materials.

Thus, it has been an objective in polymer development to take advantage of the ease of manufacture, chemical stability, and ease of processing of the simple polyolefin and styrenic polymers, while imbuing them with improved physical properties by creating composite materials that are alloys or blends of them with glass and/or other reinforcing minerals and/or with polymers representing the engineering resins. Unfortunately, because the simple hydrocarbon polymers of the first type are non-polar, and engineering resins, minerals, and glass fibers are highly polar, it is not possible to obtain composites having desirable properties simply by blending the desired materials together. What results are materials exhibiting poor physical properties owing to irregular macro-phase separation and poor adhesion between the phases.

In order to solve this problem an additional component must be added, typically referred to as a compatibilizer, which must exhibit two properties to be successful. Analogous to a detergent dispersing oil in water, the compatibilizer must reduce the surface energy between the polar and non-polar phases of the composite, but it must also link the two phases of the composite together in order to give strength to the composite. Thus, a successful compatibilizer must have a polymeric architecture that provides two distinct domains. One domain must be compatible with the non-polar polymer material of the composite, and the other domain must be compatible with the polar phase of the composite, and, additionally, the non-polar domain of the compatibilizer must be sufficiently long to entangle its chains with the chains of the non-polar phase of the composite, and the polar domain of the compatibilizer must be either reactive with nucleophilic functional groups present in the polar phase of the composite so as to chemically bond it to that phase, or the polar domain of the compatibilizer must be sufficiently long to entangle its chains into the polar phase of the composite. Such compatibilizers allow both the formation of a uniform micro-phase dispersion of one composite component into the other and a strong linkage between the two phases.

The successful development of compatibilizers that permit composites of polyolefins (e.g., polypropylene) and minerals, glass, and/or polar thermoplastics, having excellent physical properties was rapid. For example, by the early 1970's compatibilizers based on maleated polypropylene were available for the manufacture of polyolefin based composite materials. Such compatibilizers are commercially available, such as those sold by Crompton Corporation under the trademark Polybond. The maleic anhydride domain of these compatibilizers is reacted with the nucleophilic amines and hydroxy functional groups in polyamides, polyesters, and polycarbonates, and with the amino silanes used to modify the surface of glass fibers and other mineral fillers. The architecture of maleated polypropylene is not random, but, rather, the maleic anhydride graft occurs naturally on the ends of the polypropylene chain. Thus, it meets both criteria for a successful compatibilizer: the maleated ends are reactive with and compatible with the polar phase of the composite, and the polyolefin domain is compatible with and sufficiently long to chain entangle with the polyolefin phase of the composite material.

The addition of two or three percent of such compatibilizer to an alloy of polypropylene with glass or polar thermoplastic polymer yields composites with fine dispersion and excellent physical properties. The same composites without the compatibilizer exhibit non-uniform macro-phase separation and poor physical properties.

Attempts to apply the analogous solution to the other major hydrocarbon polymer group, styrenics, have been without success. Maleation of polystyrene is random along the polystyrene chain and is not located on the ends of the chain, as is the case for polypropylene. Similarly, copolymerization of styrene monomer and maleic anhydride yields an alternating copolymer, and copolymerization of styrene with other nucleophile reactive monomers is random along the polystyrene chain.

Such candidate compatibilizers contain functional groups that are reactive with the nucleophiles present in the polar thermoplastics and amine modified fillers and therefore interact with the polar phase of the composites (e.g., glass, minerals, and or polar thermoplastic polymers), yielding in some cases more uniform dispersions of the one material in the other. However, because the architecture of these candidate compatibilizers is random, there are no separate domains, and, therefore, no domain that is compatible with the polystyrene phase of the composite and sufficiently long to chain entangle with the polystyrene in the composite. As a result, even with improved dispersion of one phase in the other, the required improvement in the physical properties of the alloy material is not achieved, and, indeed, sometimes there is even a degradation of physical properties compared to the same alloy without the candidate compatibilizer.

This success of the strategy with polyolefin composites and failure in polystyrene composites was studied and reported by Ide et al., *J. Appl. Polym. Sci.*, 18(4):963–74 (1974), and the poor results in polystyrene composites using this strategy with a wide range of reactive monomer copolymerized with styrene or grafted randomly onto styrene has been widely reported throughout the polymer literature. See, for example, Park et al., *Polymer*, 37(14):3055–3063 (1996), Chang et al., *Polymer Engineering and Science*, 31(21): 1509–1519 (1991), and Jannasch et al., *Journal of Applied Polymer Science*, 58:753–770 (1995).

Subsequently, researchers recognized that the presence of reactive functional groups like maleic anhydride were necessary, but not sufficient for good compatibilization of polystyrene with polar materials. In addition to this, the placement of the nucleophile reactive functional groups within the compatibilizer polymer architecture must be non-random. With this understanding, better, but still insufficient, solutions were proposed. These solutions met both the criteria of dispersing one phase in the other and of creating links between the two phases in the composite, but at the price of complex methods of manufacture and, more seriously, the introduction into the polystyrene composite of extraneous materials that altered and partially degraded the intended physical and chemical property advantages of the alloy.

A maleate-grafted derivative of the well-known anionically produced tri-block copolymer polystyrene-polybutadiene-polystyrene is commercially available from Shell Chemical under the trade designation Kraton FX1901. Here, because polybutadiene is selectively maleated over polystyrene, only the polybutadiene block is maleated. This compatibilizer then meets both criteria. The center maleated butadiene block is reactive with the polar phase of the alloy, and the styrene blocks are compatible with and sufficiently long to chain entangle the polystyrene phase of the alloy. This compatibilizer has found application in certain cases wherein the introduction of a third rubbery phase is feasible. See, for example, Park et al., *Polymer*, 42:7465–7475 (2002). However, this compatibilizer's introduction to the alloy of an additional rubbery polybutadiene phase with low $T_g$ and very poor oxidative stability is generally undesirable. The latter deficiency can be reduced in part by hydrogenation of the unsaturation in the polybutadiene, but this involves extra steps and still incorporates an extraneous polymer with lower physical properties into the composite.

Braat et al., WO 0046274 A1, observed that polyphenyleneoxide (PPO), which is thermodynamically compatible with styrene and has terminal phenol groups, may be maleated to produce PPO with terminal succinic anhydride groups. This compatibilizer meets both criteria for a successful compatibilizer in that the terminal succinic anhydride groups are reactive with the nucleophiles present in the polar phase of the composite and the PPO segment is compatible with the polystyrene phase of the composite and sufficiently long to chain entangle it. See, for example, Bank et al. WO 059197 A2. However, this compatibilizer also necessitates the introduction into the composite of an extraneous polymer (PPO) with different chemical and physical properties. For example, phenolics are well known to degrade in sunlight and oxygen to form highly colored quinones.

Koulouri et al., *Macromolecules*, 32:6242–6248 (1999) overcame the need to introduce an extraneous polymer into the alloy by carrying out atom-transfer-addition of maleic anhydride to the ends of alpha,omega-dibromopolystyrene. The resulting polystyrene is terminated by bromosuccinic anhydride. This compatibilizer is only polystyrene bearing nucleophile reactive end groups and the material was demonstrated to form excellent alloys with polyamides. Both dispersion and physical properties were significantly improved. However, the presence of bromosuccinic anhydride makes this compatibilizer impractical to use owing to the unstable carbon/bromine bond present in the bromosuccinic anhydride end groups, which is well known to release corrosive hydrobromic acid under mild conditions of for example, heat and/or humidity.

Thus, a need remains in the art for a means to produce an alloy between styrenic polymers and polar materials, such as glass, minerals, or polar thermoplastics, having both good phase separation/dispersion and good physical properties without the simultaneous inclusion of corrosive functional groups or extraneous polymeric materials with undesirable properties.

SUMMARY OF THE INVENTION

The present invention is directed to composites of styrenic polymers with polar materials such as minerals, organic fillers, glass, such as glass fibers, and/or polar thermoplastic polymers, such as a polyamide, that are free from extraneous polymers or corrosive reactive functional groups. As employed herein and in the claims, the term "styrenic polymer" is defined as a polymer or copolymer of monomeric styrene or a styrene derivative, for example, atactic-polystyrene, syndiotactic-polystyrene, poly(p-methylstyrene), poly(p-chloromethylstyrene), poly(p-(sulfonic acid) styrene), and the like, as well as polymers that are completely miscible therewith, for example, polyphenylene oxide, and mixtures of the foregoing. The composites comprise such a styrenic polymer, a polar component (for example, minerals, organic fillers, glass, such as glass fibers, and/or polar polymers, such as a polyamide) and from 0.5 to 10, preferably from 1 to 5, more preferably from 2 to 3 wt % of a compatibilizer having the following formula:

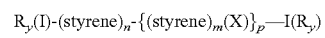

$$R_y(I)\text{-(styrene)}_n\text{-}\{\text{(styrene)}_m(X)\}_p\text{—I}(R_y)$$

wherein:

R is the residue of a nitroxide used to regulate the polymerization;

I is the residue of the radical initiator used to initiate polymerization;

n is an integer from 50 to 750, preferably from 200 to 500, more preferably from 300 to 500;

m is an integer from 0 to 10, preferably from 1 to 5, more preferably from 1 to 2;

y is an integer from 0 to 1, preferably 0;

p is an integer from 1 to 50, preferably from 1 to 20, more preferably from 1 to 10; and X is any polymerized monomeric moiety having functional group(s) capable of reacting with the nucleophilic functional groups present in the polar component of the composite at the temperature at which the composite components are mixed.

The styrene-based compatibilizer, which is free of extraneous polymers or corrosive halogens, can be readily prepared by controlled-living free radical polymerization (CLFRP) methods recently described in the literature. The examples herein were prepared on the basis of the general principle of nitroxide mediated CLFRP elucidated by Georges, et al., *Macromolecules*, 26(20):5316–20 (1993).

More particularly, the present invention is directed to a composite composition comprising the reaction product of a mixture of a styrenic polymer, as defined above, a polar component having nucleophilic functional groups and selected from the group consisting of glass and polyamides, and from 0.5 to 10 wt % of a compatibilizer having the formula:

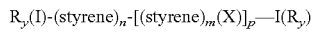

wherein:
R is the residue of a nitroxide used to regulate the polymerization of the compatibilizer;
I is the residue of a radical initiator used to initiate polymerization of the compatibilizer;
n is an integer from 50 to 750;
m is an integer from 0 to 10;
p is an integer from 1 to 50;
y is an integer from 0 to 1; and
X is any polymerized monomeric moiety having at least one functional group capable of reacting with the nucleophilic functional groups present in the polar component of the composite at the temperature at which the composite components are mixed.

DESCRIPTION OF THE PREFERRED EMBODIMENTS

The most convenient way to prepare the compatibilizer is to initiate polymerization of styrene, or styrene plus a reactive co-monomer (X), with a peroxide, such as benzoyl peroxide, or an alkyl-azo compound, such as azo-bis-isobutyronitrile (AIBN), or an alkoxyamine compound, such as 2,2,6,6-tetramethyl-1-(1-phenylethoxy)-piperidin-4-one, in the presence of a stable free radical compound, such as 2,2,6,6-tetramethyl-piperidin-4-one-1-oxyl, also known as 4-oxo-TEMPO, which may be added separately or derived in situ in the case of initiation of polymerization by 2,2,6,6-tetramethyl-1-(1-phenylethoxy)-piperidin-4-one.

The most convenient way to prepare the compatibilizer is to initiate polymerization of styrene, or styrene plus a reactive co-monomer (X), with a peroxide, such as benzoyl peroxide, or an alkyl-azo compound, such as azo-bis-isobutyronitrile (AIBN), or an alkoxyamnine compound, such as 2,2,6,6-tetramethyl-1-(1-phenylethoxy)-piperidin-4-one, in the presence of a stable free radical compound, such as 2,2,6,6-tetramethyl-piperidin-4-one-1-oxyl, also known as 4-oxo-TEMPO, which may be added separately or derived in situ in the case of initiation of polymerization by 2,2,6,6-tetramethyl-1-(1-phenylethoxy)-piperidin-4-one.

Preferably, the stable free radical compound is a polymerization inhibitor having the structural formula:

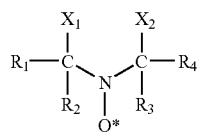

wherein:
$R_1$ and $R_4$ are independently selected from the group consisting of hydrogen, alkyl, and heteroatom-substituted alkyl and $R_2$ and $R_3$ are independently selected from the group consisting of alkyl and heteroatom-substituted alkyl; and $X_1$ and $X_2$ (1) are independently selected from the group consisting of halogen, cyano, $COOR_{11}$ (wherein $R_{11}$ is alkyl or aryl), amido, —S—$C_6H_5$, —S—$COCH_3$, —$OCOC_2H_5$, carbonyl, alkenyl, or alkyl of 1 to 15 carbon atoms, or (2) can be taken together to form a ring structure with the nitrogen, preferably of five, six, or seven members.

One of the several classes of cyclic nitroxides that can be employed in the practice of the present invention can be represented by the following structural formula:

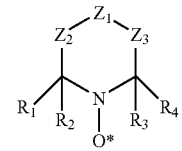

wherein $Z_1$, $Z_2$, and $Z_3$ are independently selected from the group consisting of oxygen, sulfur, secondary amines, tertiary amines, phosphorus of various oxidation states, and substituted or unsubstituted carbon atoms, such as >$CH_2$, >$CHCH_3$, >$C$=$O$, >$C(CH_3)_2$, >$CHBr$, >$CHCl$, >$CHI$, >$CHF$, >$CHOH$, >$CHCN$, >$C(OH)CN$, >$CHCOOH$, >$CHCOOCH_3$, >$CHCOOC_2H_5$, >$C(OH)COOC_2H_5$, >$C(OH)COOCH_3$, >$C(OH)CHOHC_2H_5$, >$CNR_5R_6$, >$CCONR_5R_6$, >$CH$=$NOH$, >$C$=$CH$—$C_6H_5$, >$CF_2$, >$CCl_2$, >$CBr_2$, >$CI_2$, >$CPR_{13}R_{14}R_{15}$, and the like, where $R_5$ and $R_6$ are independently selected from the group consisting of hydrogen, alkyl, aryl, and acyl and $R_{13}$, $R_{14}$, and $R_{15}$ are independently selected from the group consisting of unshared electrons, alkyl, aryl, =O, $OR_{16}$, and $NR_{17}R_{18}$, where $R_{16}$, $R_{17}$, and $R_{18}$ are independently selected from the group consisting of hydrogen, alkyl, and aryl. Where $R_5$ and/or $R_6$ are alkyl, it is preferred that they be a lower alkyl (i.e., one having one to four carbon atoms, e.g., methyl, ethyl, propyl, butyl, and isomers thereof).

Where $R_5$ and/or $R_6$ are aryl, it is preferred that they be aryl of from 6 to 10 carbon atoms, e.g., phenyl or naphthyl, which, in addition, may be substituted with non-interfering substituents, e.g., lower alkyl groups, halogens, and the like.

Where $R_5$ and/or $R_6$ are acyl, it is preferred that they be acyl of the structure

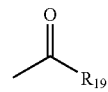

where $R_{19}$ is alkyl, aryl, $OR_{20}$, or $NR_{20}R_{21}$, and where $R_{20}$ and $R_{21}$, are alkyl, aryl, or

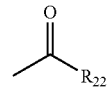

where $R_{22}$ is alkyl or aryl. Where $R_{19}$, $R_{20}$, $R_{21}$, or $R_{22}$ are alkyl, they are preferably alkyl of from 1 to 15 carbon atoms, more preferably lower alkyl of from one to four carbon atoms, as described above. Where $R_{19}$, $R_{20}$, $R_{21}$, or $R_{22}$ are aryl, they are preferably aryl of from 6 to 10 carbon atoms, as described above.

In some cases, where the functional monomer is very hindered, for example, tert.-butyl methacrylate, it may be possible to make such block copolymers by conventional anionic polymerization.

The non-polar phase of the composite material is a styrenic polymer, as defined above, i.e., a polymer or copolymer of monomeric styrene or a styrene derivative, for example, atactic-polystyrene, syndiotactic-polystyrene, poly (p-methylstyrene), poly(p-chloromethylstyrene), poly(p-(sulfonic acid) styrene), and the like, as well as polymers that are completely miscible therewith, for example, polyphenylene oxide, and mixtures of the foregoing. Preferably, the styrenic polymer is a polymer or copolymer of styrene.

The polar component of the composite material may be one or more of a mineral, glass fiber, or an organic filler, such as powdered cellulose, or a thermoplastic polymer, preferably a polyamide, such as polyamide-6 (PA-6), polyamide-66 (PA-66), polyamide-12 (PA-12).

Optionally, other additives, such as antioxidants, UV light stabilizers, dyes, pigments, processing aids, and the like, can be added to the composite material, as is typical in the production of polymeric articles.

Those skilled in the art of composite development will readily comprehend many other combinations of styrenic polymers, as defined herein, and polar materials that may be utilized with such a compatibilizer to produce desirable composite materials.

Although the nitroxide mediated radical polymerization method is specifically mentioned herein to prepare the compatibilizers of the present invention, those skilled in the art will recognize that any of the other well-known, so called "living", "pseudo-living" or "controlled" radical polymerization methods can be utilized.

The advantages and the important features of the present invention will be more apparent from the following examples.

EXAMPLE 1

General Preparation of poly(styrene-co-maleic anhydride)-block-polystyrene Maleic anhydride (0.26 g, 2.6× $10^{-3}$ mol, Acros 99%), azo-bis-isobutyronitrile (0.07 g, $4.4 \times 10^{-4}$ mol, Aldrich 98%), 1-oxyl-2,2,6,6-tetramethylpiperidin-4-one (0.18 g, $1.1 \times 10^{-3}$ mol, Crompton Corporation), styrene (100 mL, 90.9 g, 0.87 mol, Alfa Aesar 99%), anisole (7 mL, Acros 99%) (non-reactant added as standard for GC monitoring of the progress of the polymerization reaction) were placed in a 500 mL Schlenk flask followed by degassing through three Freeze-Pump-Thaw cycles.

The reactor was immersed in an oil bath that was preset to a specific reaction temperature (120° C.). Samples were taken out from the flask via syringe at timed intervals to allow kinetic data to be determined. The samples were diluted with THF for the analyses, such as gas chromatography (GC) and gel permeation chromatography (GPC).

After a certain polymerization time (18 hours), the polymerization system was removed from the oil bath and cooled to room temperature. The viscous polymer solution was diluted with THF. The produced polymers were recovered through the precipitation under methanol followed by washing with fresh methanol and drying under vacuum at 60° C. for 12 hours. This procedure is similar to those published by Park et al., *Journal of Polymer Science, Part A*, 38:2239–2244 (2000) and Benoit et al., *Macromolecules*, 33:1505–1507 (2000).

EXAMPLES 2–9

The method of Example 1 was used to prepare the following additional compatibilizer examples.

| Ex. | A | B | C | D | E | F | G | H |
|---|---|---|---|---|---|---|---|---|
| 2 | 2000:6:1:2.4 | 200 | 0.51 | 0.14 | 0.36 | 14.0 | 120 | 21 |
| 3 | 2000:28:1:2.4 | 200 | 2.40 | 0.14 | 0.36 | 14.0 | 120 | 20 |
| 4 | 800:6:1:2.4 | 200 | 1.29 | 0.36 | 0.89 | 14.0 | 120 | 25 |
| 5 | 800:28:1:2.4 | 200 | 6.00 | 0.36 | 0.89 | 14.0 | 120 | 18 |
| 6 | 1200:28:1:2.4 | 200 | 4.00 | 0.24 | 0.59 | 14.0 | 120 | 27 |

A is (styrene):(maleic anhydride):(AIBN):(oxoTEMPO).
B is styrene (mL).
C is maleic anhydride (grams).
D is AIBN (grams).
E is 4-oxoTEMPO (grams).
F is anisole* (mL).
G is temperature (° C.).
H is time (hours).
*non-reactant added as standard for GC monitoring of the progress of the polymerization reaction.

The resulting compatibilizer candidates are characterized as follows:

| Example | $M_n$ PS block | $M_n$ P(S-co-MA) block | $M_n$ Total | PDI ($M_w/M_n$) | Number of Reactive Groups |
|---|---|---|---|---|---|
| 2 | 60,000 | 1,000 | 61,000 | 1.3 | 3 |
| 3 | 41,000 | 4,000 | 45,000 | 1.4 | 14 |
| 4 | 25,000 | 1,000 | 26,000 | 1.2 | 3 |
| 5 | 25,000 | 4,000 | 29,000 | 1.3 | 14 |
| 6 | 40,000 | 4,000 | 44,000 | 1.3 | 14 |

EXAMPLE 7

Hydrolysis of poly(styrene-co-maleic anhydride)-block-polystyrene

Poly(styrene-co-maleic anhydride)-block-polystyrene (Example 2) (80 g), p-dioxane (500 mL, Acros reagent ACS), water (40 mL), sulfuric acid (~10 drops, Acros reagent ACS) were placed in a 1000 mL round bottom flask. The reactor was immersed in an oil bath that was preset to a specific reaction temperature (90° C.). After a reaction time of 24 hours, the reaction vessel was removed from the oil bath and cooled to room temperature. The polymers were recovered by precipitation under methanol followed by washing with fresh methanol and drying under vacuum at 60° C. for 12 hours.

EXAMPLE 8

Preparation of Maleic Anhydride Terminated Polystyrene 2,2,6,6-Tetramethyl-1-(1-phenylethoxy)-piperidin-4-one was prepared according to the method of Matyjaszewski et al., *Macromolecules*, 31:5955–5957 (1998), and was subsequently used to prepare living polystyrene Mn=46 k, Mw/Mn=1.3, terminated with maleic anhydride according to the method of Hawker et al., *Macromolecules*, 34:3856–3862 (2001) to yield a white powder polymer that was dried under vacuum for 2 days to give 205 grams of maleic anhydride terminated polystyrene (Mn=46 k, Mw/Mn=1.8).

EXAMPLE 9

Preparation of Poly(tert-butyl acrylate)-block-Polystyrene

In a 100 mL Schlenk flask with a magnetic stir bar was added tert-butyl acrylate (30 mL, 26.25 g, 205 mmole), anisole (3 mL), 2,2,5-trimethyl-3-(1-phenylethoxy)-4-phenyl-3-azahexane (560 mg, 1.72 mmole), and 2,2,5-trimethyl-4-phenyl-3-azahexane-3-nitroxide (15 mg, 0.068 mmole). The mixture was stirred at room temperature for 10 minutes and degassed by three freeze-pump-thaw cycles to remove oxygen. The flask was then back-filled with nitrogen and placed in an oil bath preheated to 135° C. for 50 hours. THF (30 mL) was added to dissolve all polymers and the polymers were purified by precipitation into methanol/water (80:20, v/v). The resulting powder polymer was dried under vacuum for two days to give poly(tert-butyl acrylate) 12 g (Mn=7 k, Mw/Mn=1.2).

In a 500 mL Schlenk flask with a magnetic stir bar was added poly(tert-butyl acrylate) (9 g, 1.29 mmole, Mn=7 k, Mw/Mn=1.2), styrene (200 mL, 181.8 g, 1748 mmole). The mixtures were stirred at room temperature for ten minutes and degassed by three freeze-pump-thaw cycles to remove oxygen. The flask was then back-filled with nitrogen and placed in an oil bath preheated to 120° C. for 8 hours. THF (50 mL) was added to dissolve all polymers and the polymers were purified by precipitation into methanol. The resulting white powder polymer was dried under vacuum for two days to give poly(tert-butyl acrylate)-block-polystyrene 120 g (Mn=82 k, Mw/Mn=1.4).

EXAMPLE 10

Preparation of Poly[(glycidyl methacrylate)-co-styrene]-block-Polystyrene

In a 500 mL Schlenk flask with a magnetic stir bar was added 2,2,6,6-tetramethyl-1-(1-phenylethoxy)piperidin-4-one (1.05 g, 3.64 mmole), styrene (167 mL, 151 g, 1456 mmole), glycidyl methacrylate (19 mL, 20 g, 145.6 mmole), and anisole (20 ml). The mixtures were stirred at room temperature for 10 minutes to allow all solids to dissolve and were then degassed by three freeze-pump-thaw cycles to remove oxygen. The flask was then back-filled with nitrogen and placed in an oil bath preheated to 130° C. for polymerization. After 5 hours, THF (50 mL) was added to dissolve all polymers and the polymers were purified by precipitating into methanol. The white powder was dried under vacuum for two days to give poly[(glycidyl methacrylate)$_{20}$-co-styrene$_{160}$], yield 70 g (Mn=18 k, Mw/Mn=1.3).

In a 500 mL Schlenk flask with a magnetic stir bar was added poly](glycidyl methacrylate)$_{20}$-co-styrene$_{160}$] (40 g, Mn=18 k, Mw/Mn=1.3), styrene (127 mL, 116 g, 1111 mmole), and anisole (12 ml). The mixtures were stirred at room temperature for 10 minutes to allow all solids to dissolve and were then degassed by three freeze-pump-thaw cycles to remove oxygen. The flask was then back-filled with nitrogen and placed in an oil bath preheated to 130° C. for polymerization. After 9 hours, THF (50 mL) was added to dissolve all polymers and the polymers were purified by precipitation into methanol. The white powder was dried under vacuum for two days to give poly[(glycidyl methacrylate)$_{20}$-co-polystyrene$_{160}$]-block-polystyrene$_{280}$, yield 95 g (Mn=46 k, Mw/Mn=1.3).

EXAMPLES 11–31

Preparation and Properties of Polystyrene-Glass Composites

All components were physically mixed by dry blending in the proportions indicated in the table following so as to produce 1500 grams of the mixture. The mixture was then extruded using a ZSK twin-screw extruder at 220° C., and then molded into parts for testing of Tensile Strength.

| Example | Polystyrene as Dow Styron 666 (parts) | Glass as PPG 3299 (parts) | Compatibilizer (example No./parts) | Tensile Strength (Psi) | Change in Tensile Strength (%) |
|---|---|---|---|---|---|
| 11 for comparison | 70 | 30 | na/na | 6217* | na |
| 12 | 68 | 30 | 2/2 | 9253 | 49 |
| 13 | 66 | 30 | 2/4 | 9689 | 56 |
| 14 | 68 | 30 | 3/2 | 9581 | 54 |
| 15 | 66.75 | 30 | 3/3.25 | 9668 | 55 |
| 16 | 68 | 30 | 4/2 | 9444 | 52 |
| 17 | 66.75 | 30 | 4/3.25 | 9674 | 56 |
| 18 | 68 | 30 | 5/2 | 9738 | 57 |
| 19 | 66.75 | 30 | 5/3.25 | 9575 | 54 |
| 20 | 69.5 | 30 | 6/0.5 | 9056 | 46 |
| 21 | 69 | 30 | 6/1 | 9599 | 54 |
| 22 | 68 | 30 | 6/2 | 9708 | 56 |
| 23 | 67 | 30 | 6/3 | 9762 | 57 |
| 24 | 65 | 30 | 6/5 | 10406 | 67 |
| 25 | 68 | 30 | 7/2 | 8650 | 39 |
| 26 | 69 | 30 | 8/1 | 9040 | 45 |
| 27 | 68 | 30 | 8/2 | 9614 | 55 |
| 28 | 69 | 30 | 9/1 | 10339 | 66 |
| 29 | 68 | 30 | 9/2 | 11169 | 80 |
| 30 | 69 | 30 | 10/1 | 8016 | 29 |
| 31 | 68 | 30 | 10/2 | 8083 | 30 |

*Average of 3 runs

EXAMPLES 32–33

Preparation and Properties of Polystyrene-Polyamide Composites

All components were physically mixed by dry blending in the proportions indicated in the table following so as to produce 1000 grams of the mixture. The mixture was then extruded using a ZSK twin-screw extruder at 225° C., and then molded into parts for testing of Tensile Strength.

| No. | Polystyrene as Dow Styron 666 (parts) | Polyamide as Zytel 101 (parts) | Compatibilizer (example No./parts) | Tensile Strength (Psi) | Change in Tensile Strength (%) |
|---|---|---|---|---|---|
| 32 for comparison | 50 | 50 | na/na | 8212 | na |
| 33 | 48 | 50 | 8/2 | 9544 | 16 |

In view of the many changes and modifications that can be made without departing from principles underlying the invention, reference should be made to the appended claims for an understanding of the scope of the protection to be afforded the invention.

What is claimed is:

1. A composite composition comprising the reaction product of a mixture of a styrenic polymer; a polar component having nucleophilic functional groups and selected from the group consisting of glass, polyamides, and mixtures thereof, and from 1–3 wt % of a compatibilizer having the formula:

$$R_y(I)\text{-(styrene)}_n\text{-[(styrene)}_m(X)]_p\text{—I}(R_y)$$

wherein:
R is the residue of a nitroxide used to regulate the polymerization of the compatibilizer;
I is the residue of a radical initiator used to initiate polymerization of the compatibilizer;
n is an integer from 50 to 750;
m is an integer from 0 to 10; p is an integer from 1 to 50;
y is an integer from 0 to 1; and
X is selected from the group consisting of maleic anhydride, tert.-butyl acrylate, and glycidyl methacrylate.

2. The composition of claim 1 wherein the polar component having nucleophilic functional groups is selected from the group consisting of glass fibers, polyamide-6, polyamide-66, polyamide-12, and mixtures thereof.

3. The composition of claim 1 wherein the polar component having nucleophilic functional groups is selected from the group consisting of polyamide-6, polyamide-66, polyamide-12, and mixtures thereof.

4. The composition of claim 1 wherein m is 0 and X is maleic anhydride.

5. The composition of claim 1 wherein m is 0 and X is tert.-butyl acrylate.

6. The composition of claim 1 wherein m is 0 and X is glycidyl methacrylate.

7. The composition of claim 3 wherein m is 0 and X is maleic anhydride.

8. The composition of claim 3 wherein m is 0 and X is tert.-butyl acrylate.

9. The composition of claim 3 wherein m is 0 and X is glycidyl methacrylate.

10. The composition of claim 1 wherein the compatibilizer is (polystyrene-co-maleic anhydride)-block-polystyrene or polystyrene-block-tert-butyl acrylate polymer wherein the number average molecular weight, $M_n$, of the polystyrene block is 25,000–45,000 and the maleic anhydride or butyl acrylate is either a single unit on the end of the polystyrene chain or is present in a poly(styrene-co-maleic anhydride) or poly(butyl acrylate) block having an $M_n$ of from 1000–7000.

11. The composition of claim 1 wherein I is the residue of a peroxide, an alkyl-azo compound, or an alkoxyamine compound.

12. The composition of claim 1 wherein y is 1 and R is the residue of stable free radical compound that is a polymerization inhibitor having the structural formula:

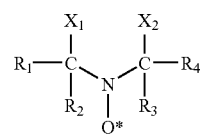

wherein: $R_1$ and $R_4$ are independently selected from the group consisting of hydrogen, alkyl, and heteroatom-substituted alkyl and $R_2$ and $R_3$ are independently selected from the group consisting of alkyl and heteroatom-substituted alkyl; and $X_1$ and $X_2$
   (1) are independently selected from the group consisting of halogen, cyano, $COOR_{11}$ (wherein $R_{11}$ is alkyl or aryl), amido, —S—$C_6H_5$, —S—$COCH_3$, —$OCOC_2H_5$, carbonyl, alkenyl, or alkyl of 1 to 15 carbon atoms, or
   (2) can be taken together to form a ring structure with the nitrogen of five, six, or seven members.

13. The composition of claim 12 wherein the stable free radical compound is 2,2,6,6-tetramethyl-piperidin-4-one-1-oxyl.

14. The composition of claim 1 wherein the styrenic polymer is a polymer or copolymer of styrene.

* * * * *